(12) United States Patent
Sharma et al.

(10) Patent No.: US 11,366,670 B2
(45) Date of Patent: *Jun. 21, 2022

(54) PREDICTIVE QUEUE CONTROL AND ALLOCATION

(71) Applicant: Bank of America Corporation, Charlotte, NC (US)

(72) Inventors: Anuj Sharma, Jaipur (IN); Gaurav Srivastava, Mumbai (IN); Vishal D. Kelkar, Mumbai (IN)

(73) Assignee: Bank of America Corporation, Charlotte, NC (US)

( * ) Notice: Subject to any disclaimer, the term of this patent is extended or adjusted under 35 U.S.C. 154(b) by 369 days.

This patent is subject to a terminal disclaimer.

(21) Appl. No.: 16/804,161

(22) Filed: Feb. 28, 2020

(65) Prior Publication Data
US 2020/0201647 A1    Jun. 25, 2020

Related U.S. Application Data (63) Continuation of application No. 15/682,739, filed on Aug. 22, 2017, now Pat. No. 10,606,604.

(51) Int. Cl.
*G06F 9/38* (2018.01)
*G06F 9/50* (2006.01)

(52) U.S. Cl.
CPC .......... *G06F 9/3851* (2013.01); *G06F 9/3806* (2013.01); *G06F 9/3855* (2013.01); *G06F 9/5011* (2013.01)

(58) Field of Classification Search
None
See application file for complete search history.

(56) References Cited

U.S. PATENT DOCUMENTS

| | | | |
|---|---|---|---|
| 5,555,396 A | 9/1996 | Alferness et al. | |
| 6,449,255 B1 * | 9/2002 | Waclawsky | H04L 29/06 370/252 |
| 6,496,773 B1 * | 12/2002 | Olsson | G08G 1/01 701/117 |

(Continued)

OTHER PUBLICATIONS

Venkataramanan et al. "On Wireless Scheduling Algorithms for Minimizing the Queue-Overflow Probability". IEEE/ACM Transactions on Networking. vol. 18, No. 3. (Year: 2010).*

*Primary Examiner* — Adam Lee (57) ABSTRACT

A predictive queue control and allocation system includes a queue and a queue control server communicatively coupled to the queue. The queue includes a first and second allocation of queue locations. The queue stores a plurality of resources. The queue control server includes an interface and a queue control engine implemented by a processor. The interface monitors the plurality of resources before the plurality of resources are stored in the queue. The queue control engine predicts that one or more conditions indicate that a queue overflow will occur in the first allocation of queue locations. The queue control engine prioritizes the plurality of resources being received by the queue. The queue control engine may apply a machine learning technique to the plurality of resources. The queue control engine transfers the plurality of resources prioritized by the machine learning technique.

17 Claims, 3 Drawing Sheets

(56) References Cited

U.S. PATENT DOCUMENTS

| | | | |
|---|---|---|---|
| 6,535,482 B1 * | 3/2003 | Hadi Salim | H04L 47/263 370/236 |
| 6,741,552 B1 * | 5/2004 | McCrosky | H04L 49/106 370/360 |
| 6,782,461 B2 | 8/2004 | Lam | |
| 6,993,602 B2 | 1/2006 | Merrill et al. | |
| 6,999,997 B2 | 2/2006 | Clarke et al. | |
| 7,865,684 B2 | 1/2011 | Michaylov et al. | |
| 8,156,374 B1 | 4/2012 | Ford et al. | |
| 9,201,716 B1 | 12/2015 | Leonard | |
| 9,432,445 B1 | 8/2016 | Leonard | |
| 9,614,784 B1 | 4/2017 | Houston et al. | |
| 2003/0105805 A1 * | 6/2003 | Jorgenson | H04L 67/142 709/230 |
| 2006/0193282 A1 * | 8/2006 | Ikawa | H04L 69/329 370/428 |
| 2008/0101406 A1 * | 5/2008 | Matoba | H04L 47/283 370/468 |
| 2008/0144633 A1 * | 6/2008 | Woloszynski | H04L 1/1867 370/395.31 |
| 2009/0217030 A1 * | 8/2009 | Premkumar | H04L 63/0428 713/153 |
| 2010/0091785 A1 * | 4/2010 | Monzawa | H04L 47/10 370/412 |
| 2011/0040669 A1 | 2/2011 | Lee et al. | |
| 2011/0151885 A1 | 6/2011 | Buyukkoc et al. | |
| 2012/0327779 A1 | 12/2012 | Gell et al. | |
| 2013/0028092 A1 * | 1/2013 | Tong | H04L 47/30 370/236 |
| 2014/0164640 A1 * | 6/2014 | Ye | H04L 47/263 709/235 |
| 2015/0312529 A1 * | 10/2015 | Bernal | G06T 7/246 348/148 |
| 2015/0358852 A1 * | 12/2015 | Richley | H04W 28/0226 370/328 |
| 2016/0077565 A1 * | 3/2016 | Jayaseelan | G06F 9/544 713/340 |
| 2018/0032373 A1 | 2/2018 | Chen et al. | |
| 2018/0188952 A1 | 7/2018 | Carlton et al. | |
| 2019/0034285 A1 | 1/2019 | Knechtel et al. | |
| 2019/0065206 A1 | 2/2019 | Sharma et al. | |

* cited by examiner

PREDICTIVE QUEUE CONTROL AND ALLOCATION

CROSS-REFERENCE TO RELATED APPLICATIONS

This application is a continuation of U.S. patent application Ser. No. 15/682,739 filed Aug. 22, 2017, by Anuj Sharma et al., and entitled "Predictive Queue Control and Allocation," which is incorporated herein by reference.

TECHNICAL FIELD

The present invention relates generally to memory and, more specifically to predictive queue control and allocation.

BACKGROUND

An enterprise may run numerous applications that rely on data received from one or more sources. The application may pull the data from specifically allocated portions of a queue, and the portions of memory may vary in size according to the application and the enterprise's resources. More complex applications may analyze vast amounts of data, requiring evermore memory to hold the data for processing. The amount of data analyzed by an application and the rate at which the application analyzes the stored data may change over time, making it difficult to efficiently allocate memory for the received data. If a system allocates an insufficient amount of memory to store the incoming data, the queue may become full which may lead to queue overflow or data corruption when subsequent data is received.

Preventing queue overflow while maintaining data integrity presents a number of technical challenges. Systems may have a limited allocation of memory to hold and process data. As the queue storage reaches capacity, attempts to add to the queue may lead to queue overflow and/or data corruption. Applications that utilize the data stored in the queue may encounter errors or stop functioning in response to the queue overflow. Conventional ways of preventing memory overflow require clearing a queue manually; resetting the queue (which causes a loss of useful data); or expanding the queue allocation, which can be costly and resource intensive.

SUMMARY

In accordance with the present disclosure, the systems and methods described in the present application provide a number of technical solutions to overcome the technical problems associated with queue overflow and data corruption. The solutions described herein allow for improved queue control, data integrity, and resource management. A predictive queue control and allocation system allows network applications to run efficiently and without error, while minimizing data loss.

In one embodiment, a predictive queue control and allocation system includes a queue and a queue control server communicatively coupled to the queue. The queue includes a first allocation of queue locations and a second allocation of queue locations. The queue configured to store a plurality of resources. The queue control server may include an interface and a queue control engine implemented by a processor operably coupled to the interface. The interface is configured to monitor the plurality of resources before the plurality of resources are stored in the queue. The queue control engine may predict that one or more conditions indicate that a queue overflow will occur in the first allocation of queue locations. The queue control engine may prioritize the plurality of resources being received by the queue according to a first resource type and a second resource type, wherein the first resource type is stored in the first allocation of queue locations and the second resource type is stored in the second allocation of queue locations. The queue control engine may also apply a machine learning technique to the plurality of resources stored in the first allocation of queue locations, wherein the machine learning technique prioritizes resource data stored in the first allocation of queue locations as the first resource type or the second resource type. And, the queue control engine may also transfer the plurality of resources prioritized by the machine learning technique as the second resource type from the first allocation of queue locations to the second allocation of queue locations.

In another embodiment, a method for predictive queue control and allocation, includes storing, at a queue, a plurality of resources, wherein the queue comprises first allocation of queue locations and a second allocation of queue locations. The method further includes monitoring, via an interface, the plurality of resources before the plurality of resources are stored in the queue. The method further includes predicting, via a processor, that one or more conditions indicate that a queue overflow will occur in the first allocation of queue locations. The method further includes prioritizing, via the processor, the plurality of resources being received by the queue according to a first resource type and a second resource type, wherein the first resource type is stored in the first allocation of queue locations and the second resource type is stored in the second allocation of queue location. The method further includes applying, via the processor, a machine learning technique to the plurality of resources stored in the first allocation of queue locations, wherein the machine learning technique prioritizes resource data stored in the first allocation of queue locations as the first resource type or the second resource type. The method further includes transferring, via the processor, the plurality of resources prioritized by the machine learning technique as the second resource type from the first allocation of queue locations to the second allocation of queue locations.

In another embodiment, a predictive queue control server includes an interface and a queue control engine implemented by a processor operably coupled to the interface. The interface is operable to monitor a plurality of resources being communicated to a queue, wherein the queue comprises a first allocation of queue locations and a second allocation of queue locations. The queue control engine is operable to predict that one or more conditions indicate that a queue overflow will occur in the first allocation of queue locations. The queue control engine may also prioritize the plurality of resources being received by the queue according to a first resource type and a second resource type, wherein the first resource type is stored in the first allocation of queue locations and the second resource type is stored in the second allocation of queue locations. The queue control engine is also operable to apply a machine learning technique to the plurality of resources stored in the first allocation of queue locations, wherein the machine learning technique prioritizes resource data stored in the first allocation of queue locations as the first resource type or the second resource type. The queue control engine is operable to transfer the plurality of resources prioritized by the machine learning technique as the second resource type from the first allocation of queue locations to the second allocation of queue locations.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
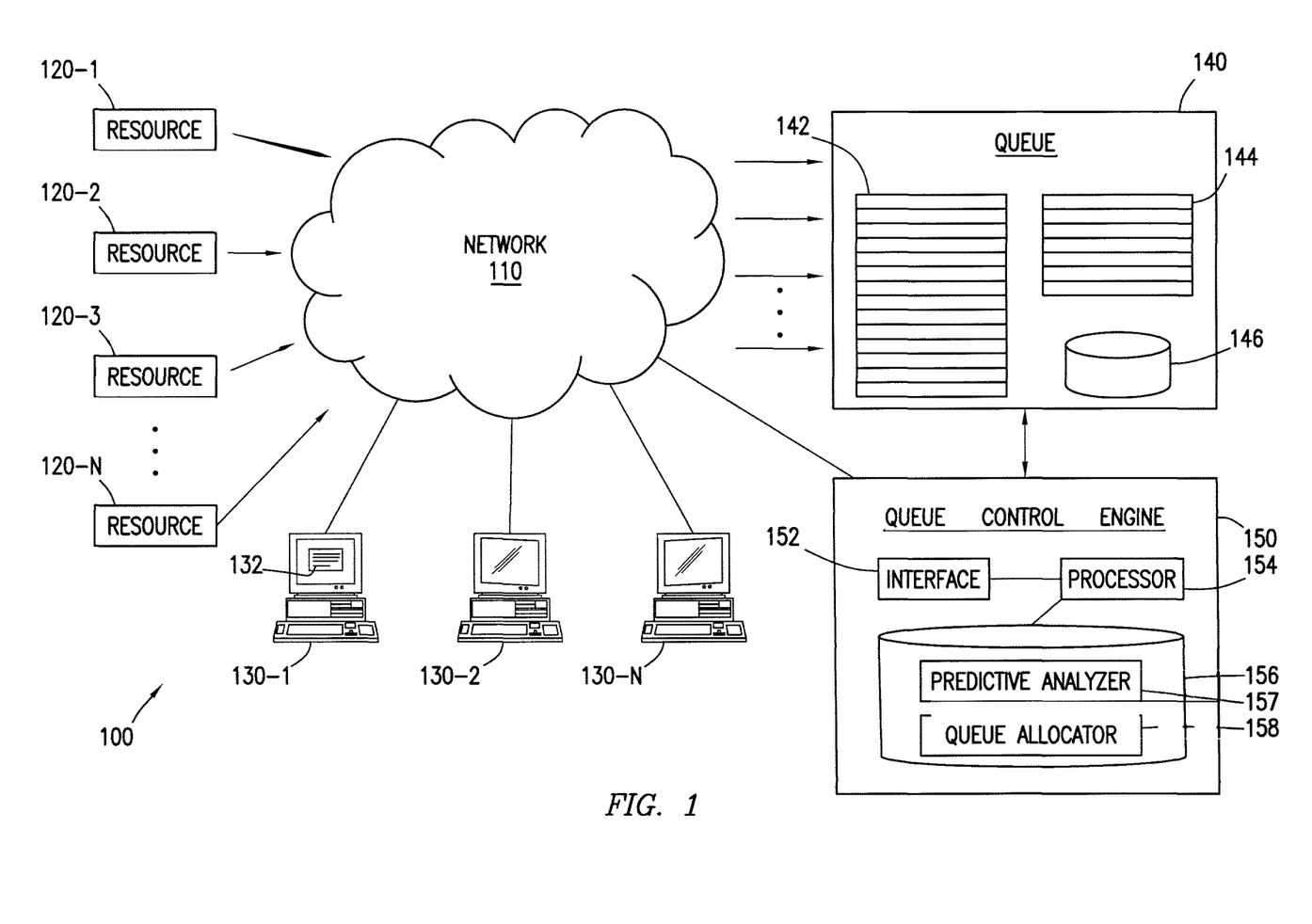
FIG. 1 is an schematic diagram of a system for predictive queue control and allocation, according an embodiment.
Figure 2:
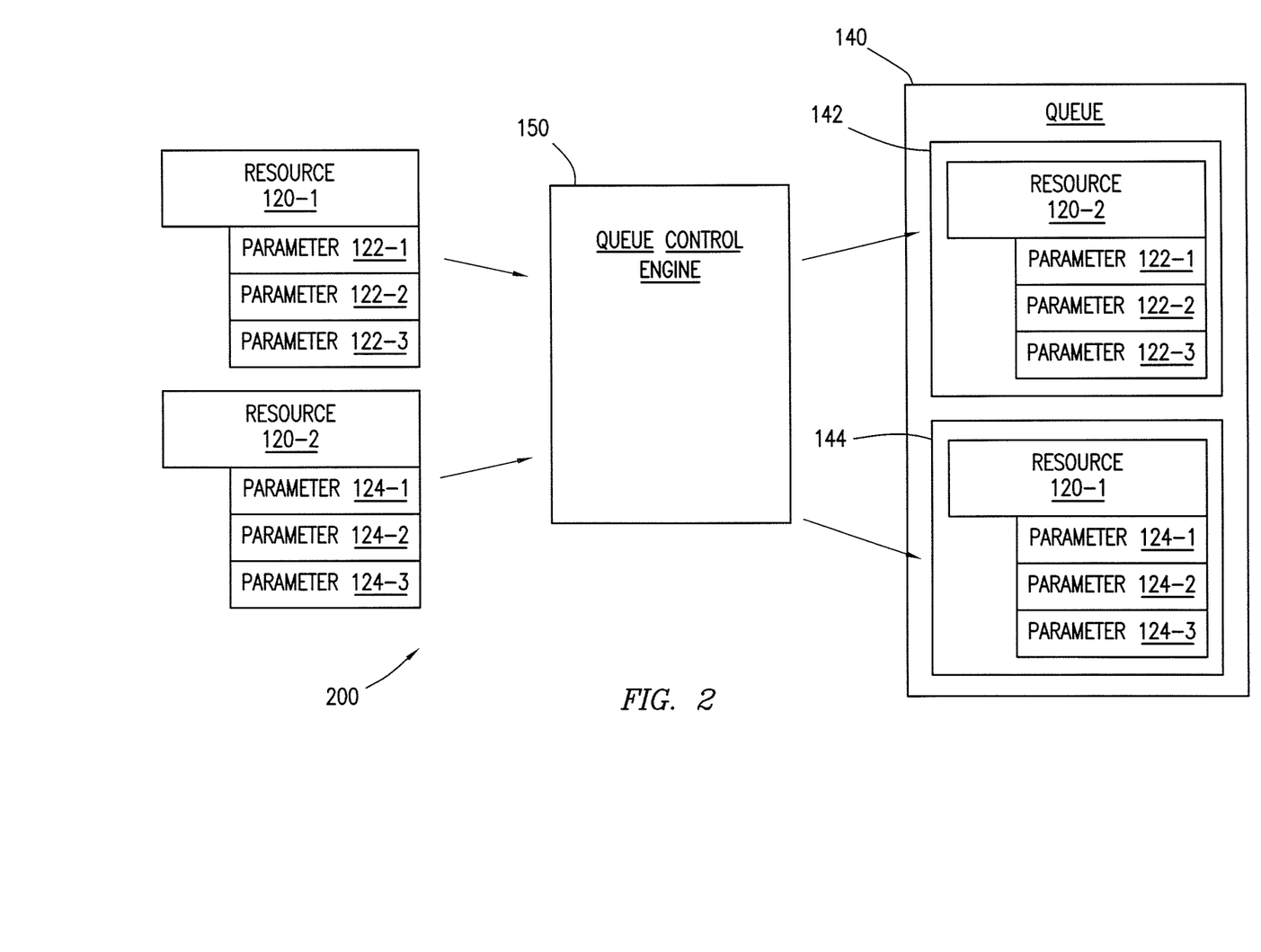
FIG. 2 is an example process of a queue control engine allocating resources to a queue, according to an embodiment.
Figure 3:
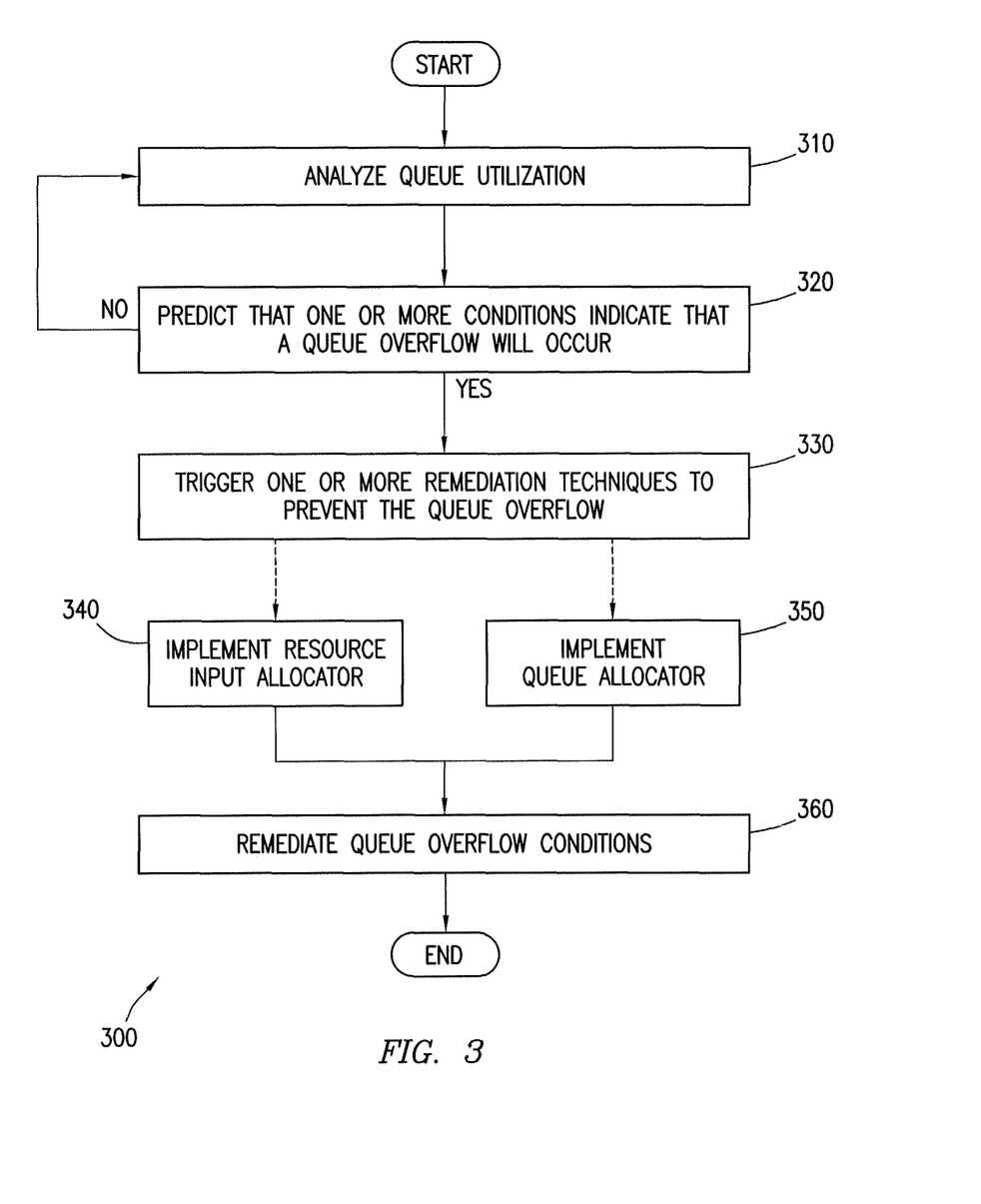
FIG. 3 is a flowchart for providing predictive queue control and allocation using the system of FIG. 1, according to an embodiment.

Embodiments of the present disclosure and its advantages are best understood by referring to FIGS. 1-3, like numerals being used for like and corresponding parts of the various drawings.

As explained above, applications that analyze large quantities of data often store the data in specifically allocated portions of a queue while the data is waiting to be processed. A number of issues may arise if the portions of the queue allocated to hold the received data become full. When an application receives additional data when the queue is already full, attempts to store the additional data may result in queue overflow-storing the data outside of the allocated queue locations. Storing data outside of the allocated queue locations may inadvertently overwrite portions of memory used for other applications, thereby causing data corruption or errors in the operation of the application.

It is therefore advantageous to provide a system and method for predictive queue control and allocation. Preventing queue overflow and avoiding the corruption of data is a problem specifically arising in the realm of computer networks. Embodiments of the present disclosure are necessarily rooted in computer technology and may monitor and analyze current conditions of an application to determine if a queue overflow situation is likely and, if so, implement one or more queue control and allocation procedures to allow subsequently received data to be properly stored. By predicting when incoming data may cause data storage problems, embodiments of the present disclosure provide an unconventional technical solution to efficiently manage the storage of incoming data.

Embodiments of the present disclosure provide a number of technical advantages over the conventional methods of managing and allocating queue resources. Technical advantages of certain embodiments may include applications that utilize real-time analysis of data to selectively and intelligently determine which data to purge or keep in the queue. By prioritizing which data may be kept in the queue, the risk of queue overflow and data corruption is minimized allowing reduced downtime of applications while improving data integrity. FIGS. 1-3 will now describe the foregoing system and methods in greater detail.

FIG. 1 is a schematic diagram of a system 100 for predictive queue control and allocation, according an embodiment. System 100 includes network 110 that facilitates the transfer of resources 120 and communication between workstations 130, queue 140 and queue control engine 150. Elements of system 100 may be internal to an enterprise. For example, one or more workstations 130, queue 140 and/or queue control engine 150 may be associated with an enterprise. An enterprise may be an individual, business, company, or other organization. An example of an enterprise may include a clothing store, an online sales company, or a financial institution, to name a few. An enterprise may include one or more lines of business, subsidiaries, or parent organizations.

Network 110 represents any suitable network operable to facilitate communication between the components of system 100. Network 110 may include any interconnecting system capable of transmitting audio, video, signals, data, messages, or any combination of the preceding. Network 110 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof operable to facilitate communication between the components.

Resources 120-1 through 120-$n$ (collectively as resources 120 or generically as a resource 120) represent any suitable type of information or data that may be stored in queue 140. Resource 120 may have one or more parameters associated with the resource. For instance, a resource 120-1 may be received by network 110 at various time intervals or frequencies (i.e., daily, hourly, real-time, historical, a specific latency etc.). Resource 120-1 may be in any number of specific formats depending factors such as the application using the resource, the type of database storing the resource, whether the resource 120-1 is being streamed or is a discrete value. The format of the resource 120-1 may determine whether the resource 120-1 is in a raw format, encrypted or encoded, or already in a format for use by an end-user application. The resources 120 may have varying degrees of size (i.e., the amount of memory the resource 120-1 utilizes in queue 140). Resources 120 may have additional parameters such as reliability, security, originating source, and the channel through which the resource is communicated (e.g., internet, VPN, broadcast, etc.).

To further describe resources 120, in some embodiments resources 120 may represent market data from one or more vendors. In this non-limiting example, a source may be a market feed (e.g., Thomson Reuters, Bloomberg, etc.), a broker, a governmental regulator (e.g., the SEC), a dealer desk among others. Resources 120 may include data from one or more global exchanges (e.g., NYSE, NASDAQ, JEG, LSE, TMX, Deutsche Boerse, etc.), data regarding various financial instruments, financial securities, articles, and reports among others. An enterprise may receive vast amounts of market data as resources 120 and store the resources in queue 140 for use by an application to analyze the market information. The foregoing description is merely illustrative. As explained below, queue control engine 150 may utilize any suitable number of parameters associated with resources 120 when implementing predictive queue control and allocation.

Workstations 130-1 through 130-$n$ (referred to collectively as workstations 130 or generically as a workstation 130) enable one or more users to monitor, administer, or otherwise interact with resources 120, queue 140, and queue control engine 150. Workstation 130 may include one or more laptops, personal computers, monitors, display devices, handheld devices, smartphones, servers, user input devices, or other suitable components for enabling user input. One or more workstations 130 may include queue 140 and/or queue control engine 150. Workstations 130 may be a part of an enterprise or could remotely access an enterprise. In the illustrated embodiment, workstations 130 include a graphical user interface (GUI) 132.

GUI 132 represents any suitable graphical arrangement of information presented to one or more users, network administrators, employees, and/or vendors. For example, GUI 132 may display information received from a website and/or queue control engine 150. GUI 132 is generally operable to tailor and filter data entered by and presented to a user. GUI 132 may provide a user with an efficient and user friendly presentation of information. GUI 132 may comprise a plurality of displays having interactive fields, pull-down lists, and buttons operated by users. GUI 132 may include multiple levels of abstraction including groupings and boundaries. It should be understood that the term GUI 132 may be used in the singular or in the plural to describe one or more GUIs 132 in each of the displays of workstations 130.

Queue 140 represents any suitable combination of hardware and software configured to store data. In the illustrated embodiment, queue 140 comprises a first allocation of queue locations 142, a second allocation of queue locations 144, and a backup database 146.

The components of queue 140 may comprise volatile memory and/or non-volatile memory. A volatile memory medium may include volatile storage. For example, the volatile storage may include random access memory (RAM), dynamic RAM (DRAM), static RAM (SRAM), and/or extended data out RAM (EDO RAM), among others. In one or more embodiments, a non-volatile memory may include non-volatile storage. For example, the non-volatile storage may include read only memory (ROM), programmable ROM (PROM), erasable PROM (EPROM), electrically erasable PROM (EEPROM), a magnetic storage medium (e.g., a hard drive, a floppy disk, a magnetic tape, etc.), ferroelectric RAM (FRAM), flash memory, a solid state drive (SSD), non-volatile RAM (NVRAM), a one-time programmable (OTP) memory, and/or optical storage (e.g., a compact disc (CD), a digital versatile disc (DVD), a BLU-RAY disc (BD), etc.), among others. The term "memory medium" may mean a "memory device," a "memory," a "storage device," a "tangible computer readable storage medium," and/or a "computer-readable medium."

In one example, a memory medium may be a volatile memory medium. For instance, a volatile memory medium may lose stored data when the volatile memory medium no longer receives power. In a second example, a memory medium may be a non-volatile memory medium. For instance, the non-volatile memory medium may not lose stored data when the volatile memory medium no longer receives power or when power is not applied. In another example, a memory medium may include a volatile memory medium and a non-volatile memory medium.

Queue control engine 150 represents any suitable components that provide predictive queue control and allocation. Queue control engine 150 may include a network server, remote server, mainframe, host computer, workstation, webserver, personal computer, file server, or any other suitable device operable to communicate with other devices and process data. In some embodiments, queue control engine 150 may execute any suitable operating system such as IBM's zSeries/Operating System (z/OS), MS-DOS, PC-DOS, MAC-OS, WINDOWS, UNIX, OpenVMS, Linux, or any other appropriate operating systems, including future operating systems.

The functions of queue control engine 150 may be performed by any suitable combination of one or more servers or other components at one or more locations. In the embodiment where queue control engine 150 is one or more servers, the servers may be public or private servers, and each server may be a virtual or physical server. The server may include one or more servers at the same or at remote locations. Queue control engine 150 may also include any suitable component that functions as a server. In some embodiments, workstation 130 and queue 140 may be integrated with queue control engine 150 or they may operate as part of the same device or devices.

In the illustrated embodiment, queue control engine 150 includes an interface 152, a processor 154, and a memory 156. Memory 156 comprises a predictive analyzer 157 and a queue allocator 158. In one or more embodiments, interface 152, processor 154, and/or memory 156 may be communicatively coupled via one or more buses. For example, a bus may include one or more of a peripheral component interconnect (PCI) bus, a serial peripheral interface (SPI) bus, an inter-integrated circuit (I2C) bus, an enhanced serial peripheral interface (eSPI) bus, a system management bus (SMBus), a universal serial bus, and a low pin count (LPC) bus, among others. In one or more embodiments, interface 152 and memory 156 may be communicatively coupled to processor 154 via one or more of a PCI-Express (PCIe) root complex and one or more PCIe switches, among others.

Interface 152 represents any suitable device operable to receive information from network 110 (e.g., resources 120), transmit information through network 110, perform suitable processing of the information, communicate to other devices, or any combination thereof. For example, interface 152 may monitor and/or analyze resources 120 before storing one or more resources in queue 140. Interface 152 may also facilitate communication with workstations 130 and queue 140. Interface 152 represents any port or connection, real or virtual, including any suitable hardware and/or software, including protocol conversion and data processing capabilities, to communicate through a LAN, WAN, or other communication system that allows queue control engine 150 to exchange information with network 110, workstation 130, queue 140, or any other components of system 100.

Processor 154 communicatively couples interface 152 and memory 156 and controls the operation of queue control engine 150. Processor 154 includes any hardware and software that operates to control and process information. Processor 154 may execute computer-executable program instructions stored in memory 156. Processor 154 may include, but is not limited to, a microprocessor, a central processing unit (CPU), an application specific integrated circuit (ASIC), a graphics processing unit (GPU), a digital signal processor (DSP), and/or state machines among others. In one or more embodiments, processor 154 may include circuitry that may interpret and/or execute program instructions and/or process data, among others. For example, processor 154 may include one or more of a system, a device, and an apparatus that may interpret and/or execute program instructions and/or process data, among others.

In one or more embodiments, processor 154 may execute instructions when implementing one or more systems, flowcharts, methods, and/or processes described herein. In one example, processor 154 may execute processor instructions stored in memory 156 in implementing one or more systems, flowcharts, methods, and/or processes described herein. In another example, processor 156 may execute instructions received via network 110 in implementing one or more systems, flowcharts, methods, and/or processes described herein.

Memory 156 stores, either permanently or temporarily, data, operational software, other information for processor 154, other components of queue control engine 150, or other components of system 100. Memory 156 includes any one or a combination of volatile or non-volatile local or remote devices suitable for storing information. For example, memory 156 may include RAM, ROM, flash memory, magnetic storage devices, optical storage devices, network storage devices, cloud storage devices, solid state devices, or any other suitable information storage device or a combination of these devices.

Memory 156 may store information in one or more databases, file systems, tree structures, any other suitable storage system, or any combination thereof. Furthermore, different information stored in memory 156 may use any of these storage systems. Moreover, any information stored in memory 156 may be encrypted or unencrypted, compressed or uncompressed, and static or editable. Although illustrated as including particular modules, memory 156 may include any suitable information for use in the operation of queue control engine 150.

Predicting Queue Allocation Conditions

In the illustrated embodiment, memory 156 includes predictive analyzer 157. Processor 154 may implement predictive analyzer 157 to analyze queue 140 and/or incoming resources 120 to determine if queue 140 is likely to experience one or more operational issues, such as a queue overflow. As explained in FIG. 2, predictive analyzer 156 may perform one or more different types of analysis to determine if an operational issue may occur, when it is likely to occur, and implement one or more remediation techniques to prevent the operational issue. In this manner, predictive analyzer 157 may predict that one or more conditions indicate that a queue overflow will occur in the first allocation of queue locations 142.

For example, in some embodiments, to determine that one or more conditions indicate that a queue overflow will occur, predictive analyzer 157 may determine a throughput rate of resources 120 as they are stored in queue 140 and processed by an application. Predictive analyzer 157 may calculate an input rate of the plurality of resources being stored in the first allocation of queue locations 142 of queue 140. The input rate may be calculated in any suitable manner. For instance, predictive analyzer 157 may calculate the input rate based on the number of resources 120 being stored per unit of time (e.g., millisecond, second, minute), the amount of new memory in the first allocation of queue locations 142 being utilized per unit of time; an average rate that resources 120 are being stored in the first allocation of queue locations 142, among others.

In some embodiments, predictive analyzer 157 may utilize a historic input rate to calculate the input rate. For example, queue 140 may typically begin receiving a large input of resources on a regular basis (e.g., 9:30 a.m. Eastern Time). Predictive analyzer 157 may use this historic input rate to determine whether to implement one or more remediation techniques to ensure that no operational issues occur with queue 140. For instance, a historic input rate may be compared to an actual input rate to determine if the amount of resources 120 being received exceeds typical received rates. If queue 140 can typically handle the historic input rate of resources 120 without encountering an operational issue then predictive analyzer may determine that no remediation techniques need to be implemented. If the historic input rate is lower than the actual input rate, predicative analyzer may determine if queue 140 can handle the increase in resources 120. And, if queue 140 cannot handle the increase in resources 120, the predictive analyzer 157 may implement one or more remediation techniques, such as implementing queue allocator 158.

Predictive analyzer 157 may also calculate a processing rate of resources 120 being stored in the first allocation of queue locations 142. For example, predictive analyzer 157 may determine how efficiently or how quickly an application is able to process the resources being stored in the first allocation of queue locations 142. Once resource 120-1 is processed by the application, that memory can then be used to store a new resource 120-2. Predictive analyzer 157 may utilize any suitable method to determine the processing rate of resources 120. A number of factors may determine the processing rate, such as the complexity of the operations being performed by the application; the size of the resources being analyzed; the ability for the application to pull/access resources 120 from queue 140 among others. Thus, in some embodiments, the processing rate may change based on the application utilizing the resources 120.

In some embodiments, predictive analyzer 157 may utilize both the input rate and the processing rate to calculate a throughput rate. The throughput rate may indicate a rate at which resources 120 are being stored and processed by queue 140. If there is a low throughput rate, the amount of available memory in the first allocation of queue locations 142 may be decreasing as resources 120 are being stored quicker than they are being processed. If the throughput rate is low, predictive analyzer may implement one or more remediation techniques to ensure that incoming resources 120 do not cause an operational issue with queue 140, such as a queue overflow. Predictive analyzer 157 may use the throughput rate to determine the severity of the storage issue, which may inform when and/or what type(s) of remediation techniques should be implemented.

Implementing Remediation Techniques for Queue Allocation

In some embodiments, predictive analyzer 157 may implement a remediation technique if the throughput rate deviates from a predetermined rate. The predetermined rate may be set to any suitable value based on how the input rate and the processing rate are determined. As a non-limiting example, the input rate may be determined based on bytes per second of resources being stored (e.g., X bytes stored/1 second). The processing rate may also be calculated based on bytes per second (e.g., Y bytes processed/1 second). The throughput may be determined by subtracting the rates (e.g., X−Y bytes/1 second). If the throughput rate is greater than a predetermined bytes per second (e.g., Z bytes/1 second) indicating that more bytes of data are being stored than processed, then one or more remediation techniques may be implemented. The foregoing is merely illustrative; any suitable predetermined rate may be established by predictive analyzer 157.

Should predictive analyzer 157 predict that one or more conditions indicate that a queue overflow will occur in the first allocation of queue locations 142, queue control engine 150 may utilize processor 154 to implement queue allocator 158. Queue allocator 158 may implement one or more remediation techniques to prevent operational issues with queue 140.

An example of a remediation technique that queue allocator 158 may apply to queue 140 includes prioritizing the resources 120 being received by queue 140 before they are stored. In some embodiments, resources 120 may be prioritized into two or more types (e.g., a first resource type and a second resource type) using any suitable standard to prioritize resources 120. Resources 120 that are prioritized as a first resource type may be stored in the first allocation of queue locations 142 and resources 120 that are prioritized as a second resource type may be stored in the second allocation of queue locations 144.

In certain embodiments, queue allocator 158 may prioritize resources 120 using a third resource type. Resources 120 prioritized as a third resource type may be stored in the backup database 146. In some embodiments, it may be beneficial to use a third priority type of resources if the calculated throughput rate is especially high or if it is determined that there is a large quantity of irrelevant data types being received (e.g., redundant data, data format not used by an application, etc.).

To determine which priority to apply to resource 120, queue allocator 158 may analyze one or more of the parameters associated with the resources 120. For example, a parameter associated with a resource 120 may indicate how frequently a source transmits a resource 120. Queue allocator 158 may determine that resources 120 with a real-time frequency are prioritized as a first resource type and resources 120 with a different frequency (e.g., resources 120 having a high latency) are prioritized as a second resource type. In this manner, queue allocator 158 may ensure that the most recent data prioritized as a first resource type is stored in the first allocation of queue locations and processed first by the application using queue 140. Resources 120 characterized as a second resource type may be stored in the second allocation of queue locations and processed by the application at a later time, if at all. As another example, queue allocator 158 may determine that an application processes a specific format of data quicker than other formats. Thus, queue allocator 158 may prioritize resources 120 with the format processed by the application faster as the first resource type.

As an example of another remediation technique that may be used to prevent one or more operational issues from affecting queue 140, queue allocator 158 may analyze resources 120 already stored in the first allocation of queue locations 142 and remove resources 120 having a low priority. For example, similar to the process of prioritizing resources 120 as they are received by queue 140, queue allocator 158 may prioritize the resources 120, or a subset of the resources 120, that are already stored in the first allocation of queue locations 142. Resources 120 that are prioritized as a second resource type may then be transferred from the first allocation of queue locations 142 to the second allocation of queue locations 144. In this manner, queue allocator 158 may free-up memory locations in the first allocation of queue locations 142.

In some embodiments, prioritization of the first resource type and the second resource type are determined by the application that utilizes the resources 120 stored in queue 140. For example, an application may be analyzing a specific type of data. The application may determine that in order to analyze the data, it needs information related to a specific parameter associated with resources 120. Thus, queue allocator 158 may prioritize resources 120 received at queue 140 and/or resources 120 that are already stored in the first allocation of queue locations 142 using the specific parameter identified by the application.

For example, an application may be used to determine the value of a used car. Resources 120 may comprise information regarding used car models being offered for sale throughout the country. If the application is used to determine a competitive value for a specific make, model, and year car, then queue allocator 158 may prioritize resources 120 according to parameters such as the car make, the car model, and the car year. Cars that have different makes or models may be prioritized as a second resource type and stored in the second allocation of queue locations 144. The application may then process the relevant resources 120 stored in the first allocation of queue locations 142 to determine a proper value for the car.

In one or more embodiments, one or more systems, processes, and/or methods may utilize one or more machine learning systems, processes, and/or methods that may maintain and track data relationships over time to implement the prioritization of resources 120. For example, the one or more machine learning systems, processes, and/or methods may determine measures representing a strength of a relationship between or among resources 120 and a resources relevance to an application using the resources 120.

In one or more embodiments, resources 120 may be classified and/or tagged, based on one or more classifications, and may be provided to the one or more machine learning systems, processes, and/or methods. For example, the one or more machine learning systems, processes, and/or methods may utilize the resources 120 and tags of the resources 120 within a graph system to determine additional relationships between or among elements and/or to extend a data graph (e.g., a database) by constructing new tag attributes to capture the additional relationships. For instance, data within a specific resource 120-1 may be correlated with information that an application is analyzing. The machine learning systems, processes, and/or methods may identify the correlation and make informed decisions regarding whether the specific resource 120-1 should be prioritized as a first or second resource type.

In one or more embodiments, the one or more machine learning systems, processes, and/or methods may statistically measure a strength of an affinity between or among data objects, which may allow and/or may permit one or more results to be specified within one or more confidence intervals. For example, one or more static classification rules and/or tags may be replaced with one or more dynamic correlation scores. For instance, the one or more machine learning systems, processes, and/or methods may be initiated with known related elements, and the one or more machine learning systems, processes, and/or methods may derive additional related data based on one or more correlations and/or one or more stochastics.

In one or more embodiments, relationship discovery may be dynamic and/or may be able to captures evolving one or more relationships between or among data as the data is utilized by one or more systems, processes, and/or methods. For example, the data may be utilized by one or more systems, processes, and/or methods of a cloud computing infrastructure and/or environment. In this fashion, the one or more machine learning systems, processes, and/or methods may provide one or more means to place attributes and/or tags on data objects to determine whether a specific resource 120-1 should be prioritized as a first resource type and, therefore stored in the first allocation of queue locations 142 to be analyzed by an application.

Accordingly, in some embodiments, queue allocator 158 may apply a machine learning technique to resources 120 stored in the first allocation of queue locations 142. The machine learning technique may prioritize the resources 120 as a first resource type or a second resource type. Resources 120 prioritized as a second resource type may then be transferred from the first allocation of queue locations 142 to the second allocation of queue locations 144. In certain embodiments, the machine learning technique may prioritize resources 120 stored in the first allocation of queue locations 142 using a third resource type. Resources 120 prioritized as a third resource type may be transferred from the first allocation of queue locations 142 to the backup database 146.

A component of system 100 may include an interface, logic, memory, and other suitable elements. An interface receives input, sends output processes the input and/or output, and performs other suitable operations. An interface may comprise hardware and software. Logic performs the operation of the component. For example, logic executes instructions to generate output from input. Logic may include hardware, software and other logic. Logic may be encoded in one or more nontransitory, tangible media, such as a computer readable medium or any other suitable tangible medium, and may perform operations when executed by a computer. Certain logic, such as a processor, may manage the operation of a component. Examples of a processor include one or more computers, one or more microprocessors, one or more applications, and other logic.

Modifications, additions, or omissions may be made to system 100 without departing from the scope of the disclosure. For example, although system 100 is illustrated as having predictive analyzer 157 separate from queue allocator 158, predictive analyzer 157 and queue allocator 158 may be combined to form a single program. As another example, in the illustrated embodiment queue 140 is illustrated as being separate from queue control engine 150; however, in certain embodiments queue 140 may be part of queue control engine 150. For example, queue may be part of memory 156. As another example, the first allocation of queue locations 142 is shown as being separate from the second allocation of queue locations 144. However, the first allocation of queue locations 142 and the second allocation of queue locations 144 may be part of the same queue and/or memory device. Any suitable logic may perform the functions of system 100 and the components within system 100.

FIG. 2 is an example process 200 of queue control engine 150 allocating resources 120 to queue 140, according to an embodiment. In the illustrated embodiment, queue control engine 150 is implementing one or more remediation techniques on resources 120 to prevent an operational issue with queue 140. In process 200, queue control engine 150 analyzes resource 120-1 and resource 120-2 to determine which portion of queue 140 the resources should be allocated.

In some embodiments, queue control engine 150 may analyze one or more parameters associated with resources 120-1 and 120-2 to determine how to prioritize the resource. In the illustrated embodiment, resource 120-1 comprises parameters 122-1 through 122-3. Similarly, resource 120-2 comprises parameters 124-1 through 124-3. Depending on the type of resource 120, parameters 122 and 124 may refer to any suitable type of information. For example, if resources 120 are associated with market trade data, parameters 122 and 124 may include information such as latency (1ms, 10 ms, 100 ms, is, etc.), a source of the resource (e.g., Thompson Reuters, Bloomberg, etc.), a format of the resource 124 (e.g., a file type), among others.

Queue control engine 150 may utilize any suitable number of parameters associated with resources 120 when implementing predictive queue control and allocation. In some embodiments, an application using the resources 120 may indicate a parameter to base the priority on. For example, an application may prefer data with a certain data type. Thus, resources 120 having data in this specified data type may receive a higher priority than resources 120 not having the specified data type.

In some embodiments, queue control engine 150 may then store resource 120 in queue 140 based on the prioritization given to the resource 120. For example, in the illustrated embodiment, resource 120-2 is prioritized as a first resource type and, therefore stored in the first allocation of queue locations 142. In contrast, resource 120-1 is identified as a second resource type and stored in the second allocation of queue locations 144. In this manner, queue control engine 150 may reduce the number of resources 120 being stored in the first allocation of queue locations 142 thereby reducing the likelihood that the first allocation of queue locations 142 will become full and subsequent resources 120 will cause queue overflow.

FIG. 3 is a flowchart 300 for providing predictive queue control and allocation using system 100 of FIG. 1, according to an embodiment. At step 310, queue control engine 150 may analyze the utilization of queue 140. Queue control engine 150 may also monitor the incoming resources 120 being stored in queue 140. Queue control engine 150 may analyze any suitable parameters to monitor the utilization of queue 140. For example, queue control engine 150 may analyze various operating conditions of queue 140 including the processing rate that an application processes resources 120 stored in queue 140. Queue control engine 150 may also analyze the input rate that resources are being stored to queue 140. Queue control engine 150 may also monitor the percent of queue 140, or any specific portion of queue 140 (such as the first allocation of queue locations 142) that is currently being utilized.

At step 320, queue control engine 150 may predict that a queue overflow will occur based on the analysis of the queue 140 utilization. For example, queue control engine 150 may determine that based on the input rate of resources being stored in the first allocation of queue locations 142 and the processing rate of resources 120 being processed in the first allocation of queue locations 142, that the first allocation of queue locations will encounter an operational issue (e.g., a queue overflow). If queue control engine 150 does not determine that a queue overflow condition will occur, the sequence may return to step 310 and queue control engine 150 may continue to monitor queue 140 utilization. If queue control engine 150 does determine that a queue overflow condition will occur, the sequence may proceed to step 330.

At step 330, after determining that an operational issue will occur, queue control engine 150 may implement one or more remediation techniques to prevent a queue overflow. For example, at step 340, queue control engine 150 may implement a resource input allocator to allocate resources 120 between a different portions of queue 140. In some embodiments, queue control engine 150 may prioritize resources 120 as they are received by queue 140 but before resources 120 are stored in queue 140. As explained above in regards to FIGS. 1 and 2, any suitable technique may be used to prioritize the resources 120. Resources 120 prioritized as a first resource type may be stored in a first allocation of queue locations 142 in queue 140 while resources 120 prioritized as a second resource type may be stored in a second allocation of queue locations 144 in queue 140. In this manner, step 340 may prevent resources 120 having a lower priority from being stored and processed by an application before higher priority resources 120 are processed. This may free-up additional space in the first allocation of queue locations 142 thereby preventing resources 120 from causing queue overflow thereby corrupting other data and losing the resource 120.

Additionally or alternatively, method 300 may perform step 350. For example, queue control engine 150 may implement a queue allocator to prioritize resources 120 already stored in the first allocation of queue locations 142 in queue 140. As described in FIGS. 1 and 2, queue control engine 150 may implement one or more methods to prioritize the resources 120 already stored in the first allocation of queue locations 142. In some embodiments, queue control engine 150 may implement a machine learning technique to determine which resources 120 are a first resource type and which resources 120 are a second resource type. Resources 120 having a second resource type may then be transferred by queue control engine 150 to the second allocation of queue locations 144.

Queue control engine may perform both steps 340 and 350 in parallel or serially. For example, in some embodiments, step 340 may be performed at the same time as step 350. In some embodiments, step 350 may be performed first and step 340 may be performed second. In those embodiments, step 350 may be performed to prioritize the resources already in the first allocation of queue locations 142 and then prevent lower priority resources 120 from being stored in the first allocation of queue locations 142 by performing step 340.

At step 360, queue control engine 150 may remediate the queue overflow conditions by implementing the steps at 340 and/or 350 until queue control engine 150 determines that the conditions causing the prediction of the queue overflow cease. Once the conditions causing the potential queue overflow end, queue control engine 150 may stop prioritizing the resources 120 according to steps 340 and 350.

Various embodiments may perform some, all, or none of the steps described above. Furthermore, one or more of these steps may be repeated or omitted from the method without deviating from the scope of the disclosure. Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

The invention claimed is:

1. A predictive queue control and allocation system comprising:
 a queue comprising a first allocation of queue locations and a second allocation of queue locations, the queue configured to store a plurality of resources; and
 a queue control server communicatively coupled to the queue, the queue control server comprising a processor configured to:
  predict that one or more conditions indicate that a queue overflow will occur in the first allocation of queue locations before an overflow occurs, wherein predicting that the queue overflow will occur comprises:
   determining a historical input rate for the first allocation of queue locations;
   determining a current input rate for the first allocation of queue locations; and
   determining that the current input rate exceeds the historical input rate for the first allocation of queue locations;
  identify information being analyzed for an application;
  determine a correlation between the information being analyzed for the application and resource data in the plurality of resources stored in the first allocation of queue locations; and
  prioritize resource data stored in the first allocation of queue locations as a first resource type or a second resource type based on the correlation between the information being analyzed for the application and the resource data in the plurality of resources stored in the first allocation of queue locations, wherein the first resource type is associated with a higher priority for processing than the second resource type, wherein the processor is further configured to transfer the plurality of resources prioritized as the second resource type from the first allocation of queue locations to the second allocation of queue locations.

2. The system of claim 1, wherein the first resource type and the second resource type are determined by an application that utilizes the plurality of resources stored in the queue.

3. The system of claim 1, wherein in order to determine that one or more conditions indicate that a queue overflow will occur in the first allocation of queue locations, the processor is further configured to:
 calculate an input rate of the plurality of resources being stored in the first allocation of queue locations;
 calculate a processing rate of the plurality of resources being stored in the first allocation of queue locations; and
 determine a throughput rate based on the input rate and the processing rate.

4. The system of claim 3, wherein the processor is further configured to prioritize the resource data stored in the first allocation of queue locations when the throughput rate is greater than a predetermined rate.

5. The system of claim 1, wherein the queue further comprises a backup database configured to store the plurality of resources.

6. The system of claim 5, wherein queue control server is further configured to:
 prioritize the plurality of resources being received by the queue according to a third resource type;
 prioritize resource data stored in the first allocation of queue locations using the third resource type; and
 transfer the plurality of resources prioritized as the third resource type from the first allocation of queue locations to the backup database.

7. A method for predictive queue control and allocation, comprising:
 storing, at a queue, a plurality of resources, wherein the queue comprises a first allocation of queue locations and a second allocation of queue locations;
 predicting that one or more conditions indicate that a queue overflow will occur in the first allocation of queue locations before an overflow occurs, wherein predicting that the queue overflow will occur comprises:
  determining a historical input rate for the first allocation of queue locations;
  determining a current input rate for the first allocation of queue locations; and
  determining that the current input rate exceeds the historical input rate for the first allocation of queue locations;
 identifying information being analyzed for an application;
 determining a correlation between the information being analyzed for the application and resource data in the plurality of resources stored in the first allocation of queue locations;
 prioritizing resource data stored in the first allocation of queue locations as a first resource type or a second resource type based on the correlation between the information being analyzed for the application and the resource data in the plurality of resources stored in the first allocation of queue locations, wherein the first resource type is associated with a higher priority for processing than the second resource type; and transferring the plurality of resources prioritized as the second resource type from the first allocation of queue locations to the second allocation of queue locations.

8. The method of claim 7, wherein the first resource type and the second resource type are determined by an application that utilizes the plurality of resources stored in the queue.

9. The method of claim 7, wherein determining that one or more conditions indicate that a queue overflow will occur in the first allocation of queue locations, comprises:
 calculating an input rate of the plurality of resources being stored in the first allocation of queue locations;
 calculating a processing rate of the plurality of resources being stored in the first allocation of queue locations; and
 determining a throughput rate based on the input rate and the processing rate.

10. The method of claim 9, further comprising prioritizing the resource data stored in the first allocation of queue locations when the throughput rate is greater than a predetermined rate.

11. The method of claim 7, wherein the queue further comprises a backup database configured to store the plurality of resources.

12. The method of claim 11, further comprising:
 prioritizing the plurality of resources being received by the queue according to a third resource type;
 prioritizing resource data stored in the first allocation of queue locations using the third resource type; and
 transferring the plurality of resources prioritized by the machine learning technique as the third resource type from the first allocation of queue locations to the backup database.

13. A predictive queue control server, comprising:
 an interface operable to:
  monitor a plurality of resources being communicated to a queue, wherein the queue comprises a first allocation of queue locations and a second allocation of queue locations; and
 a processor operably coupled to the interface, and configured to:
  predict that one or more conditions indicate that a queue overflow will occur in the first allocation of queue locations before an overflow occurs, wherein predicting that the queue overflow will occur comprises:
   determining a historical input rate for the first allocation of queue locations;
   determining a current input rate for the first allocation of queue locations; and
   determining that the current input rate exceeds the historical input rate for the first allocation of queue locations;
  identify information being analyzed for an application;
  determine a correlation between the information being analyzed for the application and resource data in the plurality of resources stored in the first allocation of queue locations;
  prioritize resource data stored in the first allocation of queue locations as a first resource type or a second resource type based on the correlation between the information being analyzed for the application and the resource data in the plurality of resources stored in the first allocation of queue locations, wherein the first resource type is associated with a higher priority for processing than the second resource type; and
  transfer the plurality of resources prioritized as the second resource type from the first allocation of queue locations to the second allocation of queue locations.

14. The server of claim 13, wherein the first resource type and the second resource type are determined by an application that utilizes the plurality of resources stored in the queue.

15. The server of claim 13, wherein in order to determine that one or more conditions indicate that a queue overflow will occur in the first allocation of queue locations, the processor is further configured to:
 calculate an input rate of the plurality of resources being stored in the first allocation of queue locations;
 calculate a processing rate of the plurality of resources being stored in the first allocation of queue locations; and
 determine a throughput rate based on the input rate and the processing rate.

16. The server of claim 15, wherein the processor is further configured to prioritize resource data stored in the first allocation of queue locations when the throughput rate is greater than a predetermined rate.

17. The server of claim 13, wherein server is further configured to:
 prioritize the plurality of resources being received by the queue according to a third resource type;
 prioritize resource data stored in the first allocation of queue locations using the third resource type; and
 transfer the plurality of resources prioritized by the machine learning technique as the third resource type from the first allocation of queue locations to a backup database of the queue.

* * * * *